No. 773,574. PATENTED NOV. 1, 1904.
S. KOSSOWSKI.
MEASURING BOTTLE.
APPLICATION FILED MAR. 16, 1904.
NO MODEL.
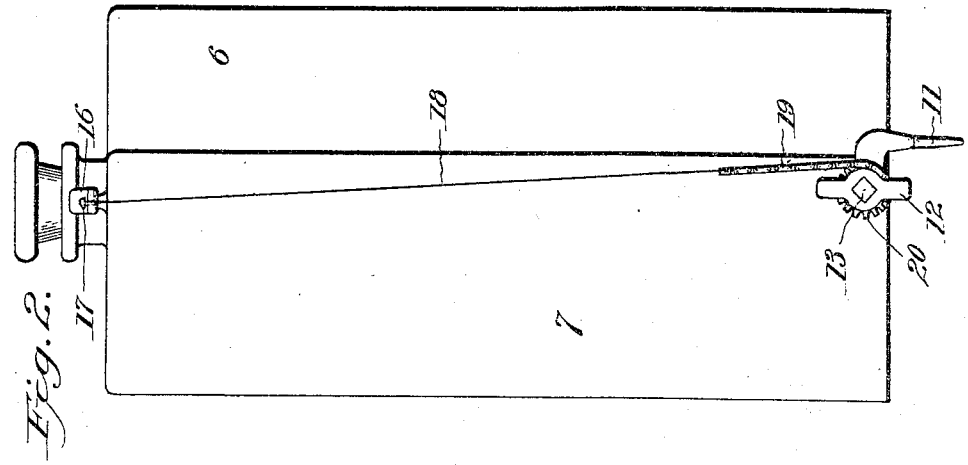
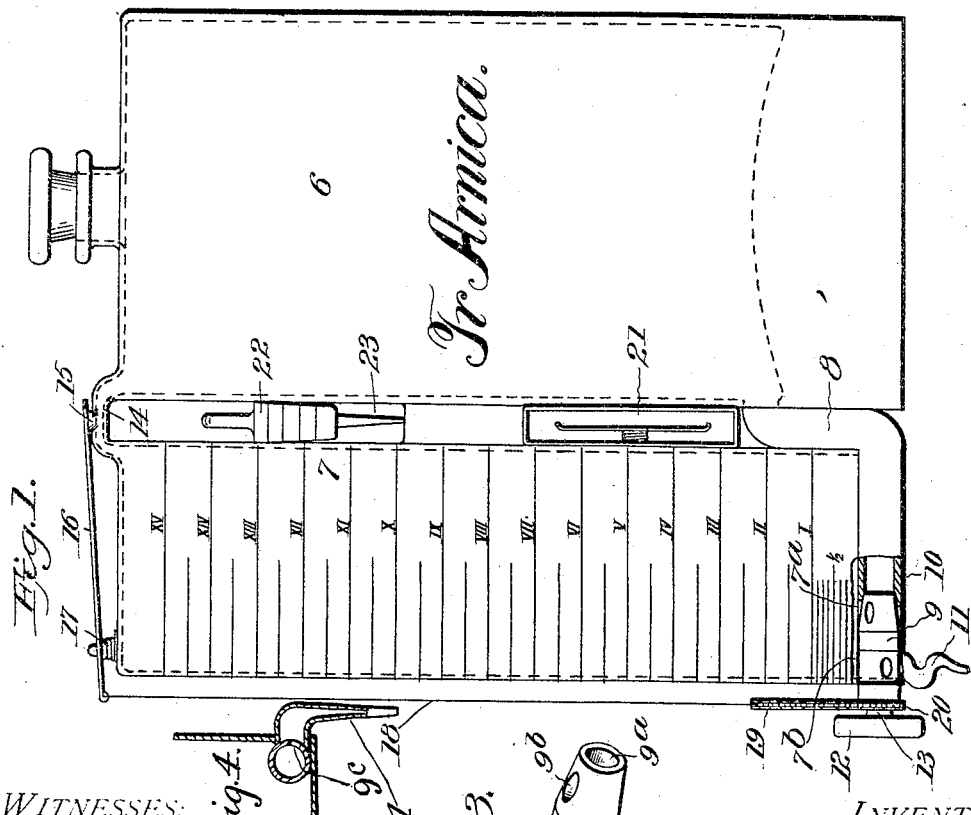
WITNESSES:
M. E. Corder
Geo. E. Tew
INVENTOR
Stanley Kossowski
By
Milo B. Stevens Co.
Attorneys No. 773,574. Patented November 1, 1904.

UNITED STATES PATENT OFFICE.

STANLEY KOSSOWSKI, OF CHICAGO, ILLINOIS.

MEASURING-BOTTLE.

SPECIFICATION forming part of Letters Patent No. 773,574, dated November 1, 1904.

Application filed March 16, 1904. Serial No. 198,351. (No model.)

*To all whom it may concern:*

Be it known that I, STANLEY KOSSOWSKI, a citizen of the United States, residing at Chicago, in the county of Cook and State of Illinois, have invented new and useful Improvements in Measuring-Bottles, of which the following is a specification.

This invention comprises particularly a measuring-bottle suitable for druggists' use, although not by any means limited thereto, as the invention may be applied to dispensing liquids of any kind in measured quantities.

The object of the invention is to provide an improved device of the kind stated which is particularly serviceable for the use of druggists and effects a great saving of time and labor in dispensing drugs.

The common method of measuring and dispensing drugs is by the use of a graduate, into which the liquid is poured from the bottle and measured, and necessarily the graduate has to be washed after each action, creating considerable disagreeable work, as well as trouble and labor of taking the bottles from the shelves and uncorking the same. The same objections are incident to dispensing liquids from vessels of any kind wherein the contents have to be poured therefrom into another vessel to be measured.

In the embodiment shown in the drawings, which is particularly designed for the use of druggists and chemists, Figure 1 is a front elevation of the bottle, partly in section. Fig. 2 is a side elevation. Fig. 3 is a detail in perspective of the plug-valve which lets the liquid from the main bottle into the measurer and lets it out from the latter. Fig. 4 is a section of the valve and adjacent parts.

Referring specifically to the drawings, the main or stock bottle is indicated at 6, and inasmuch as it does not have to be moved to dispense the liquid it may be of large size and capacity. The measuring bottle or vessel is indicated at 7 and is graduated with a scale of ounces, drams, and fractions thereof, beginning at the bottom. This measuring vessel stands beside the stock-bottle and is connected thereto by a tube 8, which leads from the bottom of the stock-bottle to the bottom of the measuring vessel, entering the latter upwardly through an opening $7^a$ in the bottom thereof and through the end opening $9^a$ and side opening $9^b$ of the plug-valve 9, which turns in a casing 10 at the end of the tube. The valve may be turned to register the openings $7^a$ and $9^b$ in an obvious manner. The bottom of the stock-bottle 6 is raised above the bottom of the measurer 7, so that the former may be drained into the latter. In the end of the plug-valve opposite to the passages above described is a diametrical valve-opening $9^c$, which may be brought to register with the outlet-opening $7^b$ in the bottom of the measurer and with a funnel or spout 11, from which the liquid may be discharged into the bottle or other vessel which is to receive it. The valve is operated by a handle 12 upon the stem 13 of the plug.

A small tube 14 connects both bottles at the top, and this tube has therein a vent-opening 15, normally closed by a plug or cap carried at one end of a lever 16, which is pivoted at 17 upon the top of the measurer and is connected at the other end by a wire or rod 18 to a chain 19, which is arranged to wind upon the wheel 20, mounted upon the stem of the plug-valve, the arrangement being such that when the plug is turned to let the liquid flow out of the measurer the chain will pull the lever and open the vent, so that the necessary air may enter, and when the valve is turned back the cap falls again.

For the particular convenience of druggists, a label-holder 21 is fixed in position between the stock-bottle and the measurer and designed to hold the labels suitable for the contents of the bottle. Also a dropper 22 is supported in a block 23, fixed in position between the bottles, and this dropper may contain and is suitable for use with the liquid or medicine of the same kind as that contained in the bottle.

By the use of the device disclosed above each bottle in a drug-store, for example, will have its own measuring vessel. When it is desired to draw liquid from such bottle, the valve is turned and the measurer allowed to fill to the required quantity. Then the valve is turned farther until the holes $7^b$ and $9^c$ register, when the measured quantity will flow out through the spout 11. In putting up prescriptions the desired quantities may be drawn in succession from the several bottles directly into the bottle which is to contain the same.

Since each bottle will have its separate measurer, the use of graduates will be unnecessary and the frequent objectionable washing thereof obviated.

The delivery of each drug from its own bottle directly into the bottle which is to receive it will avoid possible mixing of drugs and accidents due to the same or other causes.

Various other uses and modifications of the invention may be made without avoiding the same, which is not limited except as indicated by the following claim.

What I claim as new, and desire to secure by Letters Patent, is—

The combination with transparent stock and measuring bottles standing beside each other, the latter having a scale marked thereon and separate outlet and inlet openings in its bottom, of a tube connecting the bottles at the bottom and extending under the measuring-bottle, an outlet-spout leading downwardly from the tube, a valve in the tube having one passage which connects the tube to the inlet-opening and enters upwardly through the latter and another passage which connects the spout to the outlet-opening, said valve being movable to make either connection.

In testimony whereof I have signed my name to this specification in the presence of two subscribing witnesses.

STANLEY KOSSOWSKI.

Witnesses:
 STANISLAUS SZWAJKART,
 H. G. BATCHELOR.